June 30, 1925.
G. G. BELL
RAIL COACH
Filed Feb. 16, 1923
1,544,125
5 Sheets-Sheet 1
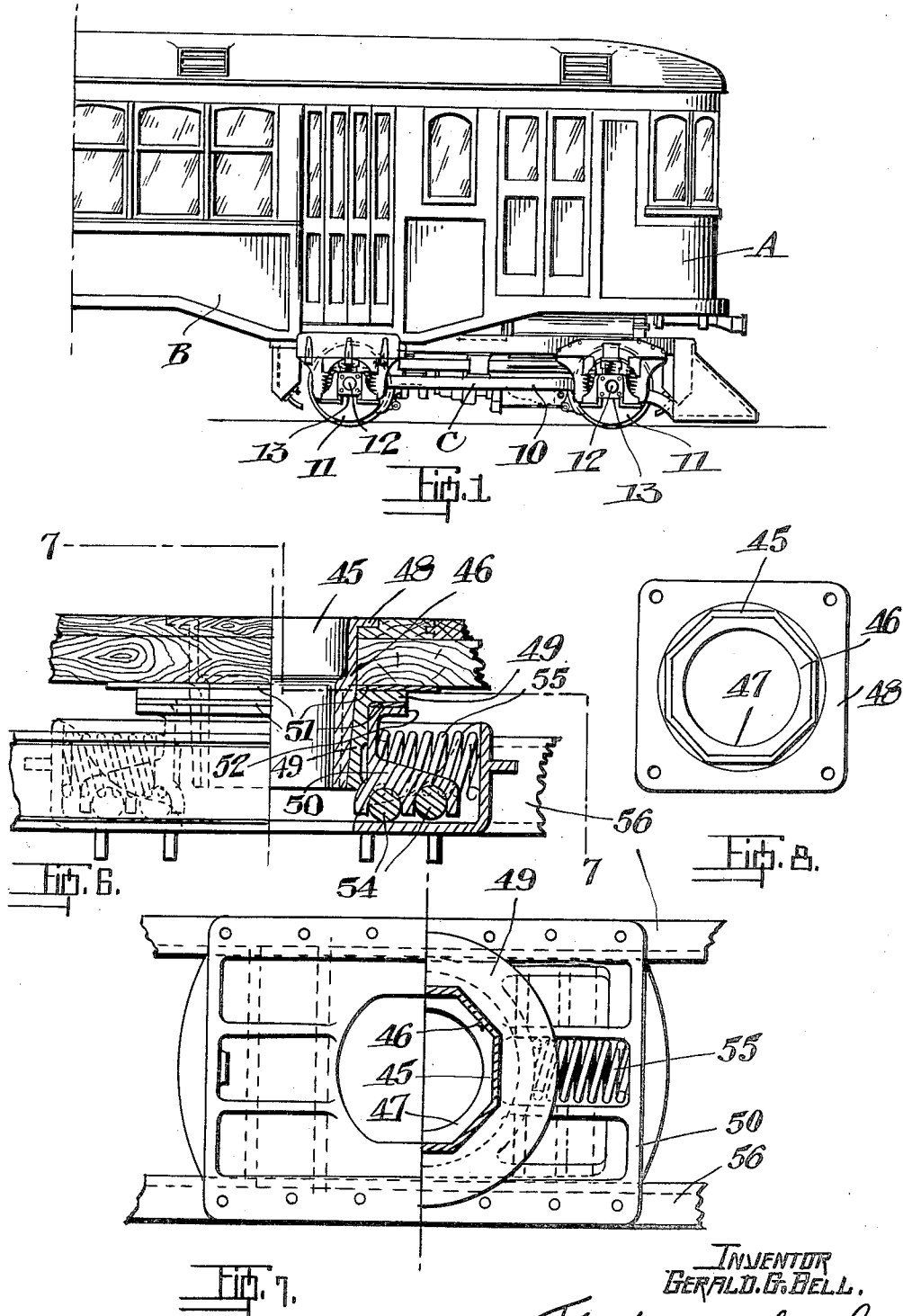

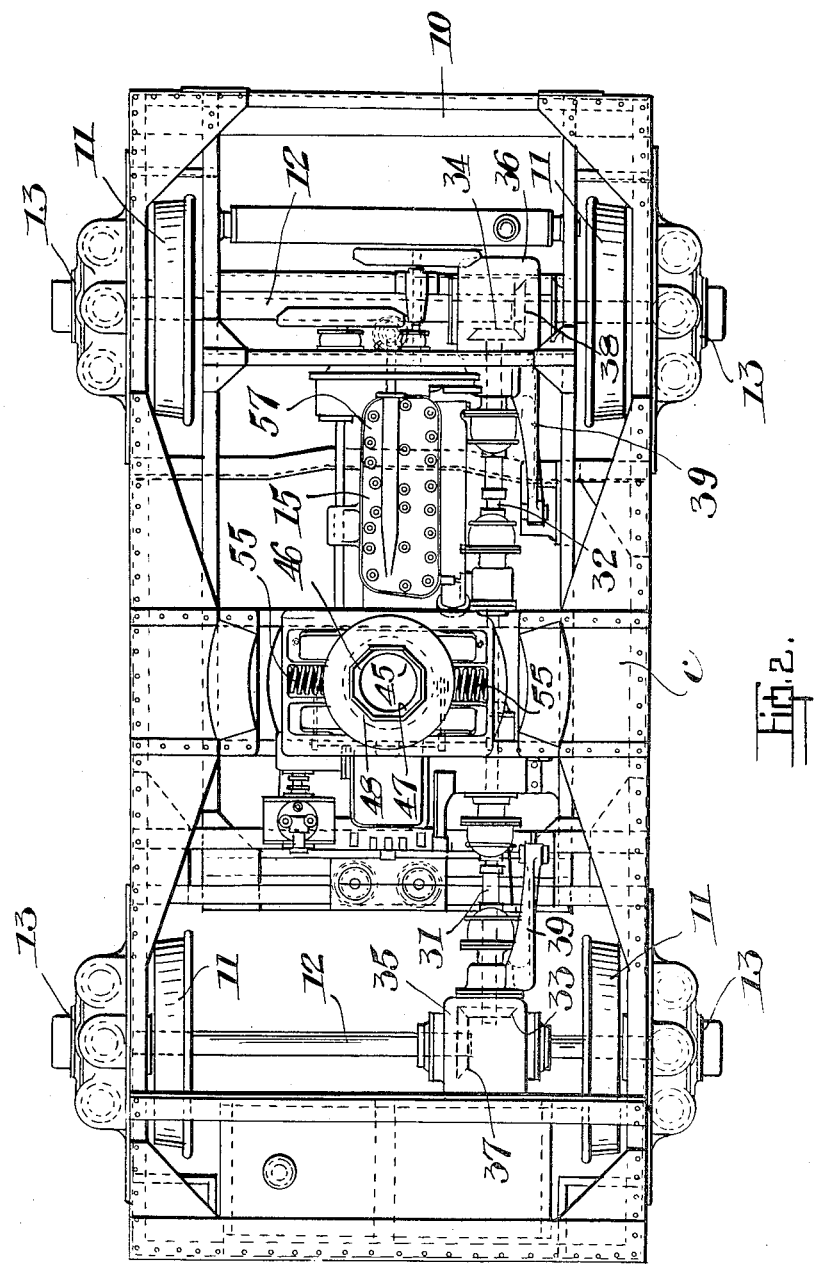

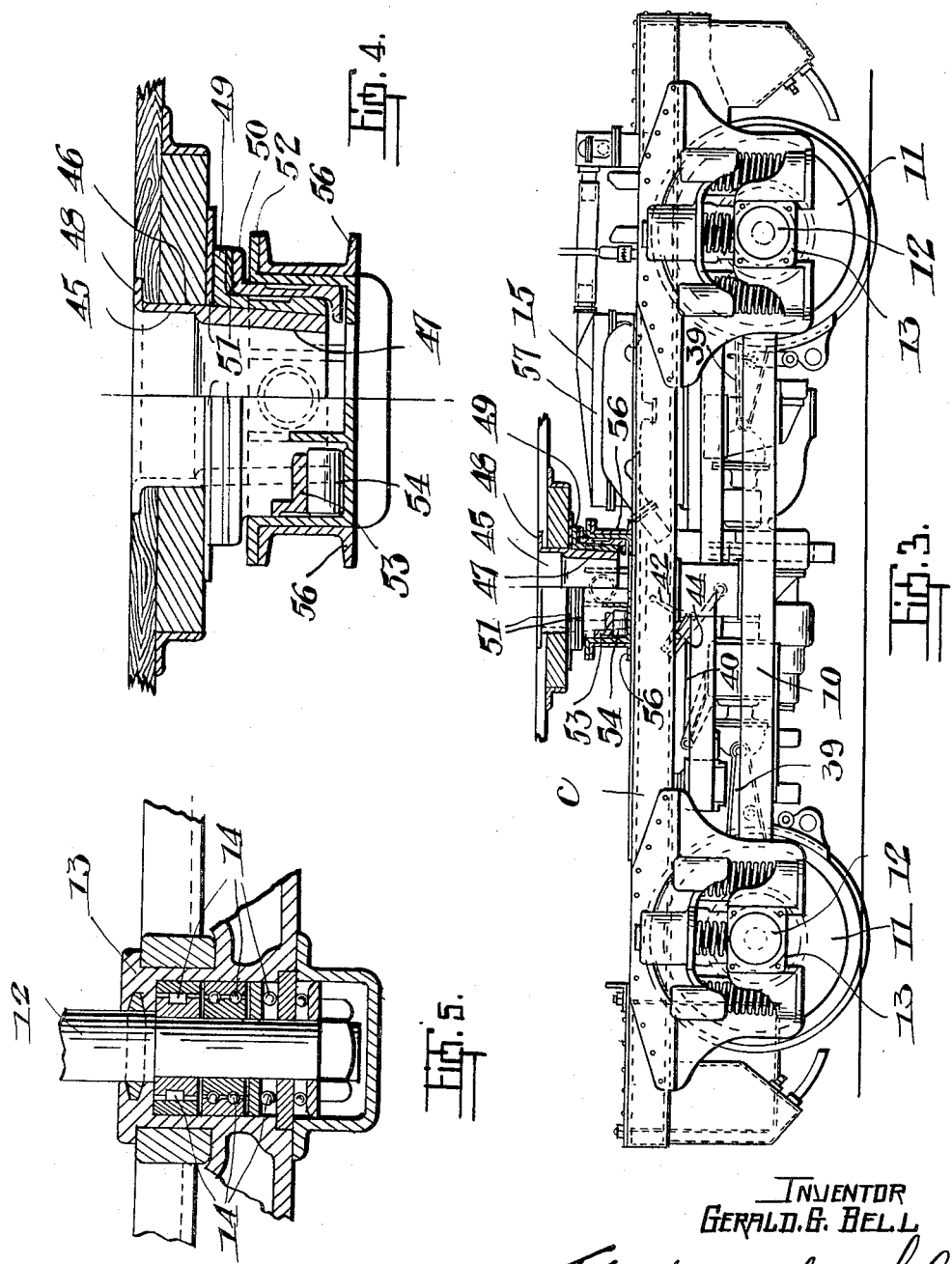

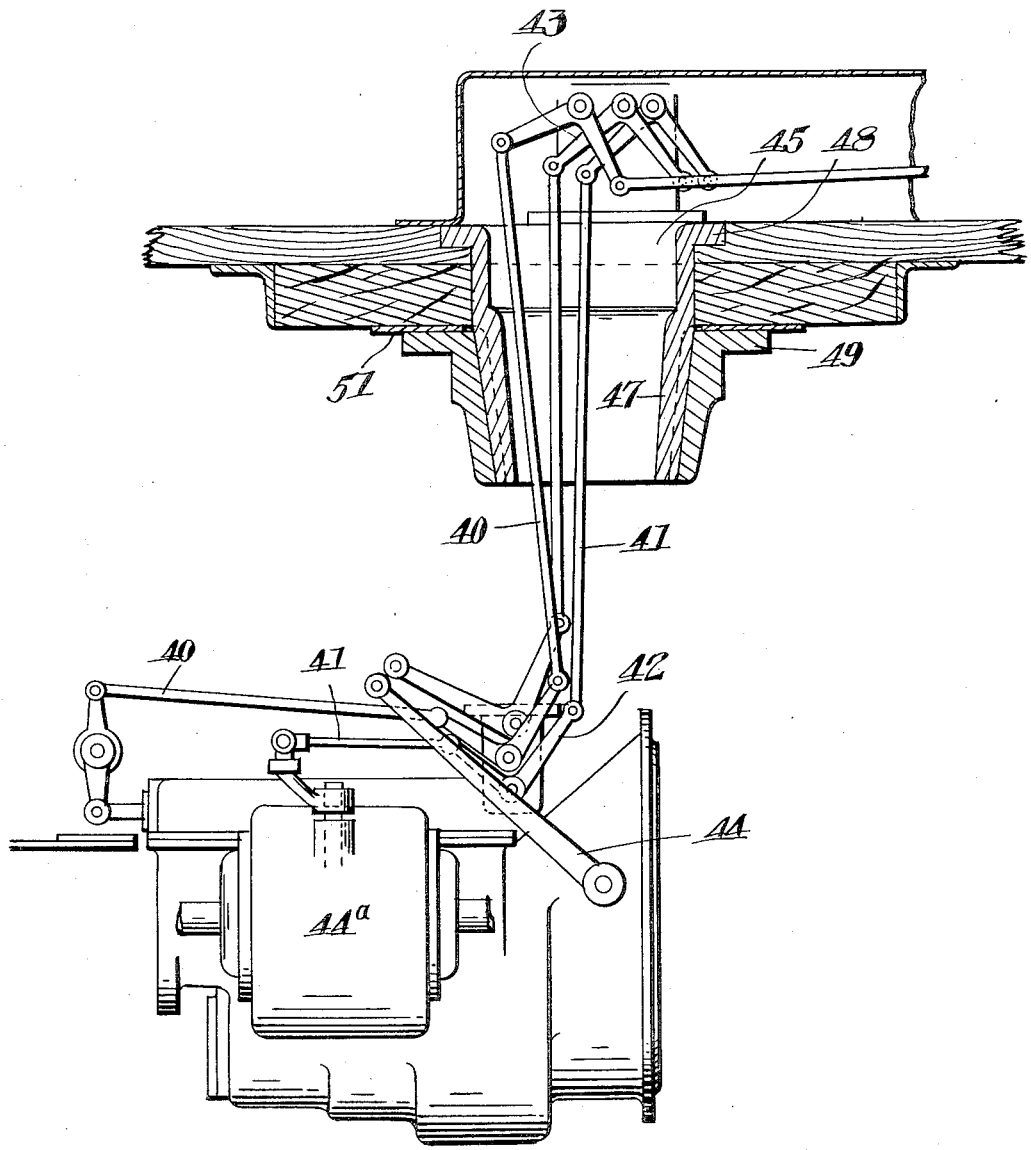

Patented June 30, 1925.

1,544,125

UNITED STATES PATENT OFFICE.

GERALD GORDON BELL, OF OTTAWA, ONTARIO, CANADA.

RAIL COACH.

Application filed February 16, 1923. Serial No. 619,431.

*To all whom it may concern:*

Be it known that I, GERALD GORDON BELL, a subject of the King of Great Britain, and resident of the city of Ottawa, in the Province of Ontario and Dominion of Canada, have invented certain new and useful Improvements in Rail Coaches, of which the following is a specification.

This invention relates to improvements in rail coaches and more particularly to improvements in internal combustion engine rail coaches and the objects of the invention are to provide a pivoted truck or bogie for railroad coaches which oscillates on a hollow king pin and in which are incorporated the various power transmission and controlled machinery to form a complete power unit and further in which the said controls are carried through the hollow king pin at a point or location in the coach where oscillation is least.

Further objects are to provide a rail coach of this kind in which the pivotal truck or car bogie is a complete car unit in itself, that may be detached from the coach by withdrawing the hollow king pin through the floor of the coach.

Still further objects are a rail coach of this character in which the hollow king pin is so mounted as to provide for lateral motion between the coach and the bogie.

Yet further objects are to provide a rail coach or car having the same number of speeds in the reverse direction as in the forward direction.

I attain the foregoing objects by means of a pivoted bogie designed to oscillate on a hollow king pin extending through the floor of a coach and by incorporating in the bogie all the various transmission and control machinery and the means for operating same and then carrying these controls as aforementioned through the hollow king pin at a point where oscillation is negligible to be operated from a suitable cabin in the front of the coach.

Furthermore, I propose to provide a new and improved rail coach comprising in combination with a bogie constituting a complete power unit, a hollow king pin designed to receive therethrough the power unit controls and to provide for oscillation and further a combination of this character in which the several parts will satisfactory perform the various functions required of them and in which greater passenger space is afforded and smoother and more efficient running of the coach is secured.

With the foregoing and other objects, hereinafter more fully explained, in view, the invention consists essentially in the novel construction and arrangement of parts as described in the specification and illustrated by the accompanying drawings that form part of the same.

Referring to the drawings, in which like characters of reference indicate corresponding parts in each figure, Figure 1 is a side elevation of the forward end of a rail coach provided with my improved bogie or truck.

Figure 2 is a top plan view of the bogie.

Figure 3 is a side elevation of the bogie.

Figure 4 is a vertical section of the hollow king pin.

Figure 5 is a section through the axle journal box.

Figure 6 is a vertical section at right angles to Figure 4.

Figure 7 is a plan view on line 7—7 of Figure 6.

Figure 8 is an inside view of the king pin.

Figure 11 is an enlarged detail view, partly in section, showing the control levers carried through the hollow king pin to be operated from the driver's cabin.

Figure 9:
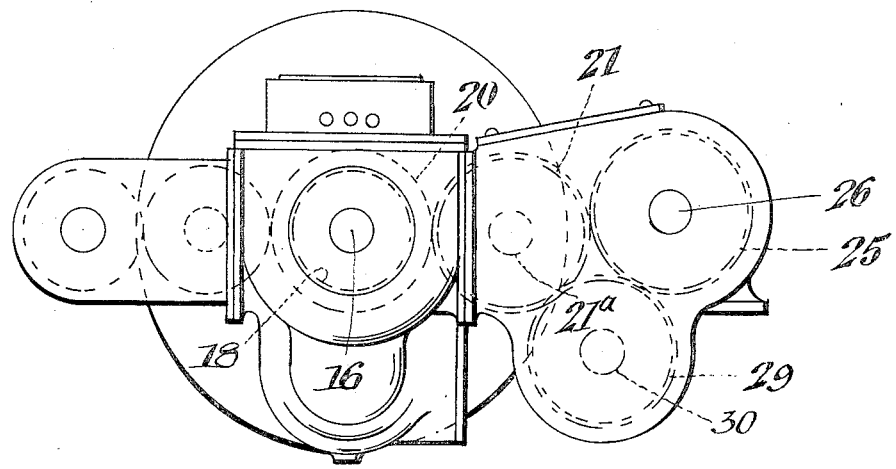
Figure 9 is an end view of the transmission mechanism and gears.

In the drawings, A designates the forward end, as shown in Figure 1, of a rail coach comprising the coach body B and two four-wheeled oscillating bogies, the forward bogie C of which is shown. This forward bogie is constituted to form a complete power unit in itself while the rear bogie is merely a trailing bogie. Both, however, are constructed on my improved principle improving the hollow king pin on which they are individually and pivotally mounted and through which, in the case of the forward bogie, the power and mechanism controls are carried.

In view of the fact that, as here illustrated, the forward bogie constitutes a complete power unit in itself, it may be termed the tractor bogie and the rear bogie may be termed the trailing bogie.

Figure 10:
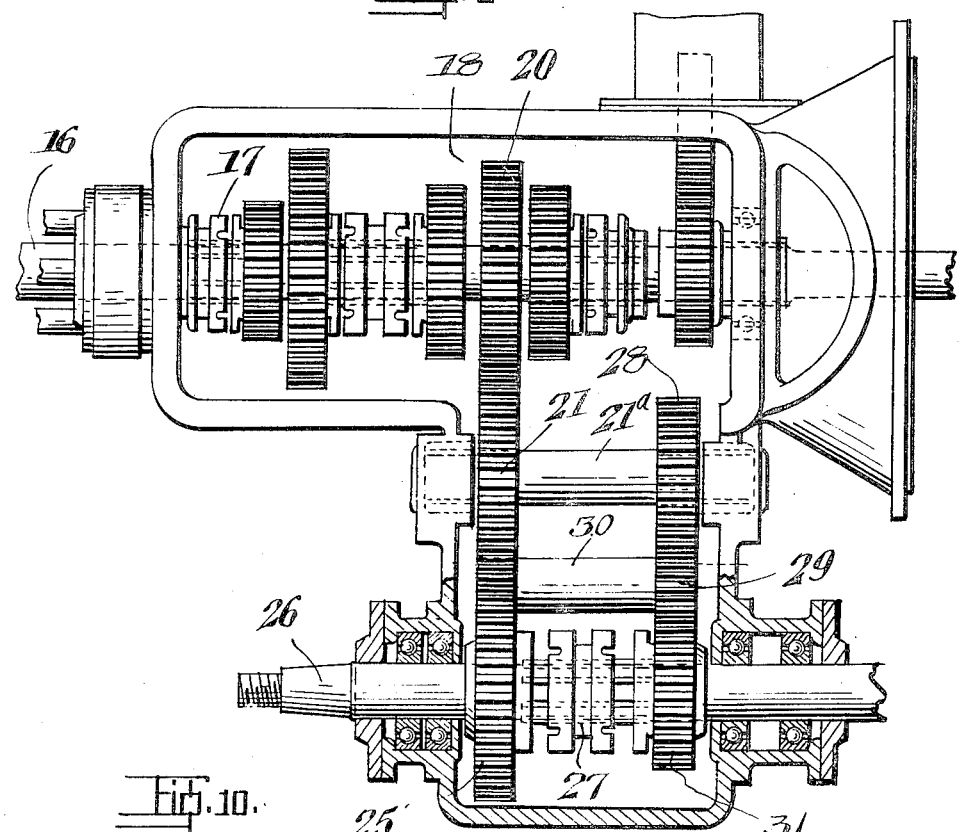
Figure 10 is a plan view of the transmission.

As illustrated in Figures 2, 3, 9 and 10, the bogie frame 10 is of the special construction to accommodate the various elements used in this invention and is supported by four wheels 11 secured on axles 12 carried by cast steel journal boxes 13 fitted with frictionless bearings 14 as shown in detail in Figure 5.

Power is supplied by the internal combustion engine 15 suitably mounted in the bogie frame and through a clutch shaft 16 and clutch 17 to the transmission 18, which contains the necessary gearing for a plurality of speeds in reverse as well as forward direction.

From the transmission 18 the power is transmitted through a gear 20 to a gear 21 on a counter-shaft 21ª and then to an idler 25 on the main shaft 26, the shaft being thrown into operation by the clutch 27.

For reverse speeds, power is transmitted through the gear 20 to the counter-shaft gears 21 and 28 and through an idler 29 on the shaft 30 to an idler 31 on the main shaft 26 which is thrown into operation by the clutch 27 engaging with the idler 31.

For operating the bogie wheels, power is transmitted by the main shaft 26 through universal joined propeller shafts 31 and 32 to bevel pinions 33 and 34 carried by housings 35 and 36 and designed to mesh with and drive the bevel gears 37 and 38 secured to the axles 12.

From the foregoing, it will be noted that power is delivered from the main transmission shaft to a parallel shaft 26 to which is connected by universal joints the propeller shafts 31 and 32, which in turn are connected through bevel pinion and gear with the axles, the housings 35 and 36 with the pinion and bevel gears being secured to the frame by means of steel arms 39 to prevent rotation of said housings on the axles, as more particularly illustrated in Figure 2.

40 are sets of levers through which the speed changes are effected while 41 is the reversing lever. These levers are in turn connected to bell crank levers 42 whereby horizontal operation or movement is changed to vertical to enable the levers in extended form to be passed through the hollow king pin 45, hereinafter more fully described. Having been passed through the king pin, a similar system of bell cranks 43 is provided whereby the original horizontal movement of the levers is restored and the sets of levers 40 and reverse lever 41 become operable by a control lever mounted in the driver's cabin in the forward end of the coach. Similarly, the clutch, brakes and other elements constituting the controlling and operating mechanism are all carried through the king pin 45 to the driver's cabin. 44 is the power clutch and 44ª the reverse clutch.

Referring more particularly to the king pin 45 which is essentially a feature of my invention and which is illustrated in Figures 4, 6, 7 and 8, it consists of an octagon casting cored out at 47 to house the controls already referred to and formed with a flat head 48 adapted to be fixedly connected to the floor of the coach or the like. This king pin 45 is provided with a housing or carrier 49 and non-rotatably mounted therein, the member 49 being formed with a cylindrical outer face and designed to rotate with the king pin in a suitable carriage 50 provided with suitable bearings and having washers 51 between it and the member 49 whereby friction is reduced as far as possible. The carrier or housing 49 is supported on the bogie frame in the carriage 50 which in turn is designed to bear on rollers 54 adapted, in combination with opposing pressure springs 55 to permit lateral motion of the carriage, thus reducing side sway of the coach, the carriage, in turn being connected to crossbars 56 on the bogie main frame.

The top of the engine is covered with a removable hood 57 and the under side with mud pans, thus keeping the engine free from dust and flying ballast.

It will be seen from the foregoing that the hollow king pin, mounted in a carriage and carrier on roller bearings 54, is used to carry control centrically from the bogie to the interior of the car. The king pin may be readily detached by removing the holding-down bolts, and disconnecting control joints, when it may be withdrawn through the floor of the car. The bogie can then be removed from the car for repairs or overhaul.

It will also be noticed that as the various working elements are beneath the coach, there is no vibration or noise in the interior of the body.

The easy removal of the bogie from the coach, moreover, ensures rapidity and satisfaction in the case of overhauls.

A further feature in the construction of my car will be noted in that the bogie frame is outside the wheels, giving a maximum bolster bearing surface and reducing coach side sway to the minimum.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A rail coach of the character described comprising a pivotal truck or bogie and a hollow king pin mounted on rollers in the bogie whereby said bogie oscillates on said pin, power transmission and operating means carried by the bogie whereby said bogie is designed to form a complete power unit and means extending through said hollow king pin whereby the bogie as a complete power unit is operated and controlled from the coach.

2. A coach of the character described comprising a pivotal bogie, a coach body on said bogie, a hollow king pin in the bogie and extending into the coach body whereby the coach oscillates on said pin, power transmission and operating means carried by the bogie whereby the bogie forms a complete power unit, and means extending through the king pin to control said transmission and operating means from the coach.

3. In a rail coach as described, the combination with a coach body, of a tractor bogie pivotally connected to said body by means of a hollow king pin, said pin adapted together with a housing to rotate in a carriage mounted on roller bearings, said carriage being mounted in a suitable carrier affixed to the bogie, means for providing oscillation and eliminating friction between the king pin housing carrying the load and the carriage, rollers in combination with pressure springs for said carriage whereby lateral movement of the carrier is permitted, power transmission and operating control levers for the tractor bogie, bell crank levers for said control and operating levers whereby said control and operating levers are carried vertically through the hollow king pin into said coach body, similar bell crank levers in said body whereby the control and operating levers assume a horizontal position to be operated from the coach.

4. In a rail coach of the character described, the combination with the coach body, of a tractor bogie provided with a hollow king pin mounted on rollers therein and designed to communicate with said body and means from the tractor bogie extending through said king pin to the coach whereby the bogie is controlled and operated from the coach.

5. In a rail coach of the class described, the combination with the body of the coach having an opening therein, of a tractor bogie pivotally connected to a hollow king pin designed to extend into said body opening, said king pin being located in a suitable housing and mounted in an operatively mounted carriage on said bogie, means for removing said pin to detach the bogie from the coach and means for carrying the controls from said bogie through said pin into the coach.

6. The combination with a vehicle of the class described of a tractor bogie pivotally connected to hollow king pin means designed to extend into said vehicle and adapted to carry the controls from the bogie to be operated within the vehicle, suitable housing for the king pin, and an operatively mounted carriage on the bogie for said housing, and means for detaching the coach from the bogie.

7. A rail coach as described in claim 1 in which four speeds forward and four reverse speeds are provided and in which the means for operating said speeds pass through the king pin connecting the bogie and the coach to be operated from the driver's cabin within the coach.

In witness whereof I have hereunto set my hand in the presence of a witness.

GERALD GORDON BELL.

Witness:
W. T. CUFF QUIN.